UNITED STATES PATENT OFFICE 2,375,611

PRODUCTION OF AMIDINES

Harry James Barber, Gidea Park, Romford, and Alan David Henderson Self, Hornchurch, England, assignors to May & Baker Limited, Dagenham, England, a British company No Drawing. Application August 19, 1942, Serial No. 455,336. In Great Britain August 19, 1941

6 Claims. (Cl. 260—564)

This invention relates to the production of amidines and has for its object to provide a new and improved process for the production of these compounds.

Hitherto, amidines have been prepared, for example, by treating the corresponding cyano compounds with anhydrous alcoholic hydrogen chloride or hydrogen bromide and reacting the imino-ether hydrohalide thus formed with ammonia or salts thereof. An alternative method consists in reacting the corresponding nitrile with an alkali metal amide and hydrolysing the product to form the corresponding amidine or hydrohalide thereof.

It has now been found that amidines can be prepared from the corresponding amidoximes. The present invention, therefore, consists in a process for the production of amidines which comprises the reduction of amidoximes, including amidoximes substituted in the amino group (e. g., amidoximes substituted by a hydrocarbon radical).

The amidoximes employed as starting material are made in manner known per se, for example they may be prepared by the action of hydroxylamine upon the corresponding nitrile.

The reduction of the amidoxime may be carried out in a variety of different ways, commonly known per se. Any method known to be capable of reducing an organic nitrogen-containing group such as an —$NO_2$ group or an =NOH group to a primary amino group may be employed. It is, however, usually convenient to employ hydrogen in the presence of a catalyst of the group known to be capable of catalysing the reduction of an organic nitrogen group such as an $NO_2$ group or an =NOH group to the corresponding $NH_2$ group. A catalyst of the nickel group is preferred, Raney nickel being particularly useful. However, satisfactory results are also obtained by employing, for example, electrolytic reduction.

According to one embodiment of the present invention, the amidoxime is dissolved in a suitable solvent and hydrogenated at a convenient pressure, for example 30 atmospheres, and at elevated temperature, for example between 60° and 80° C. in the presence of a quantity of Raney nickel catalyst. It is usually convenient in order to obtain a soluble reduction product, to add to the solution an acid, or the ammonium salt of such acid, the amidine salt of which is relatively soluble. Examples of suitable acids are hydrochloric acid and lactic acid; suitable ammonium salts are ammonium chloride and ammonium isethionate. When, however, the amidoxime is unstable in acid it is preferable to employ the ammonium salt in place of the free acid. It will be understood that the same object may be achieved by using the corresponding salt of the amidoxime.

According to a further embodiment, the amidoxime is dissolved in a suitable conducting medium such as aqueous hydrochloric acid or sulphuric acid solution and the resulting solution made the catholyte of a separated diaphragm electrolytic cell, which may comprise a carbon anode and a coated lead cathode. After electrolysis of the catholyte solution, the required amidine is removed therefrom, conveniently in the form of a salt, for example, the hydrochloride or picrate.

The process of the present invention can be applied to the production of amidines of the general formula $R.C(=NH)NHR_1$ where R is a monovalent radical (including hydrogen) and $R_1$ represents hydrogen or a substituent radical. Examples of the radical R are alkyl groups (e. g., methyl), aryl groups (e. g. phenyl and naphthyl) and aralkyl groups (e. g., benzyl). The radical $R_1$ may represent, for example, hydrogen, a hydrocarbon radical (e. g., phenyl), or an alkylaminoalkyl group (e. g., N-di-ethyl amino-n-amyl). It will be appreciated that, in the case of the preparation of these compounds, the amidoximes employed will in general possess the formula $R.C(=NOH)NHR_1$ where R and $R_1$ have the significance above defined. In the same way, there may be produced substituted amidines in which the amino group is replaced by a nitrogen atom forming part of a closed ring, e. g., a piperidine ring. The corresponding amidoximes possess the general formula

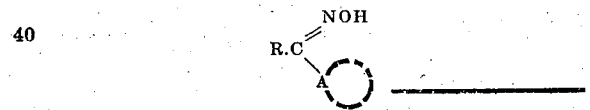

where A represents a nitrogen atom forming part of a closed ring. The process is also applicable to the production of di-amidines and an important embodiment of the present invention consists in the production, by the process hereinbefore defined, of di-amidines of the general formula:

wherein B represents an aromatic nucleus (preferably a benzene nucleus) and X represents a single linkage or a substituted or unsubstituted divalent grouping (preferably an alkane group—

$(CH_2)_n$—where $n$ is a whole number from 1 to 12, in which group one or more of the methylene groups may be replaced by an atom of oxygen or of sulphur or by an —NH-group, or an ethylenic linkage —$CR=CR_1$— where R and $R_1$ are the same or different and represent hydrogen atoms or hydrocarbon groups (preferably lower alkyl groups). The corresponding amidoximes possess in general the formula

$NH_2(NOH=)C-B-X-B-C(=NOH)NH_2$ wherein B and X have the significance above defined.

In the preparation of amidines which are unsubstituted in the amidine group it is also possible to employ N-hydroxy amidoximes, i. e., —C(=NOH)NHOH since on reduction both hydroxy groups are replaced by hydrogen atoms. In this embodiment it is preferred to carry out the reaction in the presence of an acid.

The present invention is illustrated by the following examples:

Example I 10 g. of acetamidoxime hydrochloride, prepared by known methods, were dissolved in 120 c. c. of ethyl alcohol and hydrogenated at 30 atmospheres pressure, and 60–80° C. in presence of 1 gm. of Raney nickel catalyst. Hydrogenation was complete in 65 minutes. After reduction, the reaction mixture was filtered and made faintly acid to litmus by addition of hydrochloric acid. The solution was then evaporated to dryness, and the residue of acetamidine hydrochloride recrystallised from absolute alcohol.

Example II 10 g. of benzamidoxime prepared by known methods from benzo nitrile, were dissolved in 120 c. c. s. of dry ethyl alcohol and hydrogenated at 30 atmospheres pressure and at 78° C. in the presence of 1 gm. of Raney nickel catalyst. On completion of the reduction, the product was filtered and the filtrate evaporated to dryness. The residue was dissolved in a small amount of ethyl alcohol and evaporated. The crystalline product, dissolved readily in water; from the aqueous solution benzamidine picrate was obtained by addition of excess of aqueous picric acid solution.

Example III 15 gms. of phenyl acetamidoxime, prepared by known methods, were suspended in 120 c. c. of water and treated with 9.5 c. c. of conc. hydrochloric acid till complete solution was effected. Concentrated ammonia (7.0 c. c.) was then added till the solution became just alkaline to litmus. The product was hydrogenated at 30 atmospheres pressure, and at 60° C. in presence of 1 gm. Raney nickel catalyst. Hydrogenation was complete in 80 mins. The faintly acid solution was evaporated to dryness under reduced pressure and the residue was taken up in hot 85% alcohol.

Phenyl acetamidine picrate was obtained on addition of excess alcoholic picric acid.

Example IV 15 gms. of diphenoxy propane diamidoxime (prepared by the action of a solution of hydroxylamine base in methanol on a pyridine solution of dicyano diphenoxy propane), were suspended in 150 c. c. of water, warmed to 60° C. and heated with just sufficient conc. hydrochloric acid (8.6 c. c.) to dissolve. The solution of the hydrochloride so obtained was treated with 3.6 c. c. of ammonia (5 g. of 0.88 sp. g.) till just neutral to litmus. The solution so obtained was hydrogenated at 30 atmospheres pressure, and at 60° C. in the presence of 1 gm. Raney nickel catalyst. The reaction mixture was filtered hot and the filtrate was treated with ⅔ vol. of conc. hydrochloric acid. This precipitated 4:4'-diamidino-diphenoxy propane dihydrochloride.

The product was then cooled and filtered, washed with alcohol and acetone and finally dried at 50° C. for a short time.

Example V 5.85 gms. of α:ε-diphenoxypentane-4,4'-diamidoxime dihydrochloride (prepared by known methods from 4,4'-dicyano-α:ε-diphenoxypentane) were dissolved in 70 c. c. s. of ethyl alcohol by warming. Sufficient ammonia was added to render the solution alkaline to litmus and then an alcoholic suspension of 1 gram of Raney nickel catalyst was added.

Reduction was achieved by means of hydrogen at 30 atmospheres and 65° C. in the usual catalytic reduction apparatus. On completion of reduction, the catalyst was removed by filtration and the hydrochloride of the amidine (i. e., 4,4'-diamidine-α:ε-diphenoxypentane dihydrochloride) was then isolated by the addition of acetone.

Example VI 2.27 gms. of α.naphthamidoxime, prepared by known methods, were dissolved in 100 c. c. of methyl alcohol and hydrogenated at 30 atmospheres pressure and 60° C. in presence of 0.25 gm. of Raney nickel catalyst. Hydrogenation was complete in 70 minutes. After hydrogenation, the catalyst was filtered off, and the filtrate evaporated almost to dryness, at reduced pressure. The small amount of residue was taken up in 2N.HCl until just permanently acid to Congo. The reaction mixture was then charcoaled and filtered. The filtrate was then treated with an excess of saturated aqueous picric acid solution. The precipitated picrate was filtered off, and crystallised three times from aqueous alcohol. The picrate finally obtained had M. P. 194° C. (with decomp.). Mixed M. P. with the picrate obtained from an authentic specimen of α.naphthamidine was 190°–193° C. (dec.).

Example VII 4.2 gms. of benzanilidioxime were dissolved in 100 c. c. of ethyl alcohol and hydrogenated at 30 atmospheres pressure and 60° C. in the presence of 0.5 gm. of Raney nickel catalyst. Reduction was complete in one hour. The catalyst was filtered off and the solution concentrated to dryness, stirred with water and filtered. Almost the theorectical amount of N-phenylbenzamidine (M. P. 112° C.) was obtained.

Example VIII 5.8 gms. of N(α-diethylamino-n-amyl-δ-)-benzamidoxime (prepared by the reaction of benzhydroximic chloride and α-diethylamino-δ-amino pentane in ether and having M. P. 79° C.) were dissolved in 100 c. c. of ethanol and hydrogenated at 30 atmospheres and 60° C. in the presence of 0.6 gm. of Raney nickel catalyst. When the reduction was complete, the mixture was filtered from catalyst and evaporated. It was then treated with picric acid. This gave the di-picrate of N(α-diethylamino-n-amyl-δ)-benzamidine which crystallised from alcohol in the form of small yellow rhombs M. P. 136–7° C.

Example IX 7.6 gms. of N-oxybenzamidoxime were dissolved in 150 c. c. of methanol with the addition of 4.5 gms. of lactic acid and the solution was hydrogenated at 30 atmosmpheres and 60° C. in the presence of 75 gms. of Raney nickel catalyst. Reduction was complete in one hour and after cooling the catalyst was removed by filtration. The solvent was distilled off and the residue dissolved in 100 c. c. of water. A small amount of insoluble material was filtered off and hot saturated picric acid solution was added to the filtrate. Benzamidine picrate separated as a voluminous mass of yellow needles; after cooling it was filtered off and washed with water and then recrystallised from alcohol (M. P. 230° C.).

Example X 6.2 gms. of benzoyl piperidineoxime were dissolved in 100 c. c. ethanol and hydrogenated at 30 atmospheres and 60° C. in the presence of 0.6 gm. of Raney nickel catalyst. After completion of reduction the catalyst was filtered off and the filtrate concentrated to small bulk. Treatment with picric acid gave the picrate of the hitherto unknown α-imino benzyl piperidine; it formed long yellow needles from alcohol M. P. 174° C.

Example XI 5 g. of benzamidoxime were dissolved in 40 c. c. s. of 3.3% HCl and made the catholyte of a separated diaphragm electrolytic cell, consisting of a carbon anode and a coated lead cathode. The cathode was previously prepared by anodic oxidation in 20% $H_2SO_4$ solution, using a current density of approximately 0.03 amp. per sq. cm. for 30 mins. The benzamidoxime-hydrochloride solution was electrolysed for 70 minutes, using a current density of approximately 0.05 amp. per sq. cm., and maintaining a temperature of about 25° C.

From the catholyte solution, after completion of the electrolysis, benzamidine was isolated conveniently as its picrate; M. P. 230–231° C.

Example XII 2 g. α,γ-diphenoxy propane 4:4'-diamidoxime were dissolved in 30 c. c. s. of 0.66% HCl and made the catholyte of a separated diaphragm cell as described in Example XI. The solution of the amidoxime hydrochloride was electrolysed for 75 minutes, using a current density of approximately 0.05 amp. per sq. cm., and keeping the temperature at approximately 25° C.

From the catholyte solution after electrolysis, 4:4'-diamidino-α,γ-diphenoxy propane was conveniently isolated as its hydrochloride.

We claim:

1. Process of converting an amidoxime to a corresponding amidine by reducing the =NOH group of such amidoxime to an imino group, which comprises hydrogenating the amidoxime in the presence of a metal hydrogenation catalyst.

2. Process of converting an amidoxime to a corresponding amidine by reducing the =NOH group of an amidoxime to an imino group, which comprises hydrogenating the amidoxime in the presence of a metal hydrogenation catalyst at superatmospheric pressure and at elevated temperature.

3. Process of converting a member of the class consisting of an amidoxime and a diamidoxime to a corresponding amidine by reducing =NOH of a said member to =NH, which comprises hydrogenating a said member in solution in the presence of Raney-nickel catalyst at superatmospheric pressure and at elevated temperature.

4. Process for the production of 4:4'-diamidino-alpha-gamma-diphenoxy-propane, which comprises the hydrogenation of alpha-gamma-diphenoxy-propane-4:4'-diamidoxime in solution in the presence of a nickel hydrogenation catalyst at a pressure of about 30 atmospheres and at a temperature about 60° C.

5. Process for the production of 4:4'-diamidino-alpha:epsilon-diphenoxy-pentane, which comprises the hydrogenation of alpha:epsilon-diphenoxy-pentane-4:4'-diamidoxime in solution in the presence of a nickel hydrogenation catalyst at a pressure of about 30 atmospheres and at a temperature about 65° C.

6. Process for the production of 4:4'-diamidino-diphenyl-ethylene, which comprises the hydrogenation of diphenyl-ethylene-4:4'-diamidoxime in solution in the presence of a nickel hydrogenation catalyst at a pressure of about 30 atmospheres and at a temperature about 60° C.

HARRY JAMES BARBER.
ALAN DAVID HENDERSON SELF.